(12) United States Patent
Wirnitzer et al.

(10) Patent No.: US 10,322,502 B2
(45) Date of Patent: Jun. 18, 2019

(54) SENSOR DEVICE, IN PARTICULAR HAND-HELD POWER-TOOL SENSOR DEVICE

(71) Applicant: Robert Bosch GmbH, Stuttgart (DE)

(72) Inventors: Bernd Wirnitzer, Friolzheim (DE); Matthias Tauber, Bad Boll (DE); Christopher Wiess, Weissach (DE); Christoph Klee, Stuttgart (DE); Hagen Philipp Keinath, Stuttgart (DE); Christian Lang, Stuttgart (DE); Andreas Schlegel, Leinfelden-Echterdingen (DE); Stefan Holst, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 692 days.

(21) Appl. No.: 14/863,754

(22) Filed: Sep. 24, 2015

(65) Prior Publication Data

US 2016/0089757 A1    Mar. 31, 2016

(30) Foreign Application Priority Data

Sep. 25, 2014    (DE) ........................ 10 2014 219 392

(51) Int. Cl.
    *B25D 16/00*     (2006.01)
    *B25F 5/00*     (2006.01)
    *B23Q 11/00*     (2006.01)
(52) U.S. Cl.
    CPC .......... *B25D 16/00* (2013.01); *B23Q 11/0092* (2013.01); *B25F 5/00* (2013.01); *B25D 2250/221* (2013.01)

(58) Field of Classification Search
CPC .............. B25D 16/00; B25D 2250/221; B23Q 11/0092; B25F 5/00
USPC ................................ 173/4–5, 176, 180–181
See application file for complete search history.

(56) References Cited

U.S. PATENT DOCUMENTS 4,249,117 A * 2/1981 Leukhardt ............ B23D 59/008
    173/181
5,401,124 A * 3/1995 Hettich .................. B23Q 11/04
    173/176
5,914,882 A * 6/1999 Yeghiazarians ........... F16P 3/00
    408/1 R (Continued)

FOREIGN PATENT DOCUMENTS

DE     196 41 618 A1     4/1998
DE     103 09 414 A1     9/2004
(Continued)

*Primary Examiner* — Michelle Lopez
(74) *Attorney, Agent, or Firm* — Maginot, Moore & Beck LLP

(57) ABSTRACT

The disclosure is based on a sensor device, in particular a hand-held power-tool sensor device, for identifying an uncontrolled occurrence of jamming in the case of a hand-held power tool, having at least one sensor unit, which is provided to sense at least one motion characteristic value of the hand-held power tool, and having a protective unit, which is provided to control the hand-held power tool in dependence on at least one triggering threshold value and the at least one motion characteristic value. It is proposed that the protective unit be provided to set the at least one triggering threshold value in a variable manner and/or to define at least one further triggering threshold value.

16 Claims, 3 Drawing Sheets

(56) References Cited

U.S. PATENT DOCUMENTS

| | | | | |
|---|---|---|---|---|
| 6,479,958 | B1* | 11/2002 | Thompson | B25F 5/00 |
| | | | | 318/430 |
| 7,331,406 | B2* | 2/2008 | Wottreng, Jr. | B25B 23/045 |
| | | | | 173/176 |
| 7,395,871 | B2* | 7/2008 | Carrier | B25F 5/00 |
| | | | | 173/1 |
| 7,410,006 | B2* | 8/2008 | Zhang | B23D 59/001 |
| | | | | 173/1 |
| 2001/0042630 | A1* | 11/2001 | Kristen | B25F 5/00 |
| | | | | 173/1 |
| 2003/0006050 | A1* | 1/2003 | Shinohara | B23Q 5/027 |
| | | | | 173/4 |
| 2003/0116332 | A1* | 6/2003 | Nadig | B25D 16/003 |
| | | | | 173/48 |
| 2014/0216773 | A1* | 8/2014 | Steurer | B23Q 11/0092 |
| | | | | 173/1 |

FOREIGN PATENT DOCUMENTS

| | | |
|---|---|---|
| DE | 103 61 225 A1 | 7/2005 |
| DE | 10 2004 004 170 A1 | 8/2005 |
| DE | 10 2006 037 254 A1 | 8/2007 |
| DE | 10 2013 201 708 A1 | 8/2014 |

* cited by examiner

SENSOR DEVICE, IN PARTICULAR HAND-HELD POWER-TOOL SENSOR DEVICE

This application claims priority under 35 U.S.C. § 119 to application no. DE 10 2014 219 392.3, filed on Sep. 25, 2014 in Germany, the disclosure of which is incorporated herein by reference in its entirety.

BACKGROUND

Known from DE 10309414 A1 is a sensor means for identifying an occurrence of jamming in the case of a hand-held power tool, having a motion sensor for sensing a motion quantity of the hand-held power tool in a predefined first sensitivity axis. The motion sensor has a second sensitivity axis in addition to the first sensitivity axis.

SUMMARY

The disclosure is based on a sensor device, in particular a hand-held power-tool sensor device, for identifying an uncontrolled occurrence of jamming in the case of a hand-held power tool, having at least one sensor unit, which is provided to sense at least one motion characteristic value of the hand-held power tool, and having a protective unit, which is provided to control the hand-held power tool in dependence on at least one triggering threshold value and the at least one motion characteristic value.

It is proposed that the protective unit be provided to set the at least one triggering threshold value in a variable manner and/or to define at least one further triggering threshold value. As a result, advantageously, user safety can be improved. The hand-held power tool is preferably constituted by a hammer drill and/or chipping hammer, a power screwdriver and/or power drill, a percussion drill and/or an angle grinder. An "uncontrolled occurrence of jamming" is to be understood to mean, in particular, an event in which an insert tool jams in a workpiece on which work is to be performed, the reaction torque acting on the housing being able to overcome the holding force of the operator, and the housing rotating in an uncontrolled manner over a certain angular range about an axis, in particular a rotation axis, of an insert tool fastening. A "motion characteristic value" in this context is to be understood to mean, in particular, a value of a characteristic quantity that results from an unwanted motion, in particular an unwanted rotary motion, of the hand-held power tool, and/or that allows a motion, in particular an unwanted rotary motion of the hand-held power tool, to be deduced. Advantageously, the motion characteristic value has an acceleration characteristic value and/or a rotational-speed characteristic value.

A "sensor unit" in this context is to be understood to mean, in particular, a unit provided to sense qualitatively, and/or quantitatively as a measured quantity, in particular, physical and/or chemical properties and/or the material character of its environment. Advantageously, the sensor unit comprises at least an acceleration sensor, a Hall sensor, an inertial rotation rate sensor and/or an optical sensor. Advantageously, the sensor unit has a pushbutton and/or a switch. A "protective unit" in this context is to be understood to mean, in particular, a unit provided to protect a user against an uncontrolled occurrence of jamming. Advantageously, the protective unit has at least one open-loop and/or closed-loop control unit. An "open-loop and/or closed-loop control unit" is to be understood to mean, in particular, a unit having at least one control electronics unit. A "control electronics unit" is to be understood to mean, in particular, a unit having a processor unit and having a memory unit, and having an operating program stored in the memory unit. "Controlling" in this context is to be understood to mean, in particular, switching off, brake activation, reducing rotational speed and/or increasing rotational speed. The brake activation may trigger a short circuit of a drive motor and/or trigger a mechanical brake. The expression "in dependence on" in this context is to be understood to mean, in particular, a mathematical relationship between at least two values. The protective unit is therefore preferably provided to brake a motor of the hand-held power tool.

Preferably, the protective unit is provided to control the hand-held power tool as soon as the at least one motion characteristic value attains, exceeds and/or falls below the at least one triggering threshold value. The triggering threshold value preferably describes a value at which an uncontrolled occurrence of jamming is probably or definitely present. Advantageously, the protective unit is provided to set the at least one triggering threshold value in a variable manner during operation of the hand-held power tool and/or in at least one operating state of the hand-held power tool. Furthermore, advantageously, the protective unit is provided to set the at least one triggering threshold value in a variable manner at least partially automatically, preferably fully automatically, during operation of the hand-held power tool. Furthermore, advantageously, the protective unit is provided to define the at least one further triggering threshold value during operation of the hand-held power tool and/or in at least one operating state of the hand-held power tool. Furthermore, advantageously, the protective unit is provided to define the at least one further triggering threshold value at least partially automatically, preferably fully automatically. "Provided" is to be understood to mean, in particular, specially programmed, designed and/or equipped. That an object is provided for a particular function is to be understood to mean, in particular, that the object fulfills and/or executes this particular function in at least one application state and/or operating state.

In a further design of the disclosure, it is proposed that the protective unit be provided to set the at least one triggering threshold value in dependence on a triggering frequency. A safety function such as, in particular, switching-off of the hand-held power tool can thereby advantageously be adapted to an application case. A buffer between the triggering threshold value and a working value considered appropriate by persons skilled in the art can be reduced, advantageously, without impairing user convenience. A "triggering frequency" in this context is to be understood to mean, in particular, a number of uncontrollable occurrences of jamming sensed per unit of time. Preferably, the protective unit is provided to increase the at least one triggering threshold value from a starting value up to a maximum value in the case of the triggering threshold value being exceeded several times per unit of time. Furthermore, advantageously, the protective unit is provided to subsequently reduce the at least one triggering threshold value to an initial value in the case of a low triggering frequency. Alternatively, the protective unit is provided to reduce the at least one triggering threshold value in the case of the value falling below the triggering threshold value several times per unit of time. Furthermore, advantageously, the protective unit is provided to subsequently increase the at least one triggering threshold value to an initial value in the case of a low triggering frequency.

Additionally, it is proposed that the protective unit be provided to reset the at least one triggering threshold value after operation of the hand-held power tool. A particularly high degree of safety can thereby be achieved for a user, in particular following a change of user and/or a pause. "After operation of the hand-held power tool" in this context is to be understood to mean, in particular, after the hand-held power tool has been separated from a voltage source, in particular from an electricity supply network, and/or after expiry of a downtime in which the hand-held power tool was not used. The downtime is preferably more than one minute, particularly advantageously more than 5 minutes.

Furthermore, it is proposed that the protective unit be provided to set the at least one triggering threshold value in dependence on at least one operating mode of the hand-held power tool. Advantageously, accuracy of identification of an uncontrollable occurrence of jamming can thereby be increased. An "operating mode" in this context is to be understood to mean, in particular, an operating mode that, in particular, can be set by a user. In particular, an operating mode of the hand-held power tool is to be understood to mean a transmission setting, a speed setting, a torque setting and/or a percussion setting of the hand-held power tool.

Furthermore, it is proposed that the protective unit be provided to set the at least one triggering threshold value in dependence on at least one transmission characteristic value of the hand-held power tool. Advantageously, sensing of an uncontrolled occurrence of jamming can be further improved as a result. The transmission characteristic value advantageously comprises gear stage information concerning a selected gear stage, and/or transmission ratio information concerning an existing transmission ratio. Preferably, the protective unit is provided to raise the at least one triggering threshold value in the case of an increasing transmission ratio. Similarly, the protective unit is preferably provided to lower the at least one triggering threshold value in the case of a decreasing transmission ratio.

Additionally, it is proposed that the protective unit be provided to set the at least one triggering threshold value in dependence on at least one rotational-speed characteristic value of the hand-held power tool. User safety can be further increased as a result. A "rotational-speed characteristic value" in this context is to be understood to mean, in particular, a characteristic value that comprises at least an output rotational speed of the hand-held power tool, a motor rotational speed of the hand-held power tool and/or another transmission rotational speed of the hand-held power tool. Preferably, the protective unit is provided to raise the at least one triggering threshold value in the case of an increasing rotational-speed characteristic value. Similarly, the protective unit is preferably provided to lower the at least one triggering threshold value in the case of a decreasing rotational-speed characteristic value.

Furthermore, it is proposed that the sensor device have at least one operating-mode sensor unit, which is provided to sense at least one operating mode of the hand-held power tool, the protective unit being provided to set the at least one triggering threshold value in dependence on at least one operating mode of the hand-held power tool. User convenience can thereby be increased, and consequently safety for a user can be increased. The operating-mode sensor is provided, in particular, to sense at least one existing operating mode of the hand-held power tool. The protective unit is provided, advantageously, to automatically set the at least one triggering threshold value in dependence on the operating mode sensed by the operating-mode sensor unit, in particular while operation of the hand-held power tool is ongoing.

Furthermore, it is proposed that the protective unit be provided to control the hand-held power tool differentially in dependence on the at least one triggering threshold value and the at least one motion characteristic value, and in dependence on the at least one further triggering threshold value and the at least one motion characteristic value. This advantageously enables the hand-held power tool to be switched off in a stepwise manner. In addition, user convenience can be increased. "Control differentially" in this context is to be understood to mean, in particular, to control in such a manner that the hand-held power tool executes differing operations. Preferably, the protective unit is provided to interrupt an electric power supply to the hand-held power tool in dependence on the at least one triggering threshold value and the at least one motion characteristic value. Furthermore, advantageously, the protective unit is provided to brake the hand-held power tool actively in dependence on the at least one further triggering threshold value and the at least one motion characteristic value, in particular by short-circuiting an electric motor of the hand-held power tool and/or by triggering a mechanical braking device of the hand-held power tool. In particular, the protective unit is provided to switch off the hand-held power tool temporarily, and subsequently switch it on automatically, in the case of the at least one triggering threshold value being attained and/or exceeded. Furthermore, the protective unit is advantageously provided to switch off the hand-held power tool permanently in the case of the at least one further triggering threshold value being attained and/or exceeded.

Additionally proposed is a hand-held power tool, in particular a hammer drill, having a sensor device.

Also proposed is a method for identifying an uncontrolled occurrence of jamming in the case of a hand-held power tool, at least one motion characteristic value of the hand-held power tool being sensed, and the hand-held power tool being controlled by a protective unit in dependence on at least one triggering threshold value and the at least one motion characteristic value, the at least one triggering threshold value being set in a variable manner by the protective unit and/or at least one further triggering threshold value being defined. As a result, advantageously, user safety can be improved. It is additionally proposed that the at least one triggering threshold value be set by the protective unit in dependence on a triggering frequency. In addition, it is also proposed that the hand-held power tool be braked and/or switched off in the case of the motion characteristic value exceeding a triggering threshold value that is dependent on operating mode.

The control device according to the disclosure is not intended in this case to be limited to the application and embodiment described above. In particular, the sensor device according to the disclosure, for the purpose of fulfilling a functionality described herein, may have individual elements, components and units that differ in number from a number stated herein.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
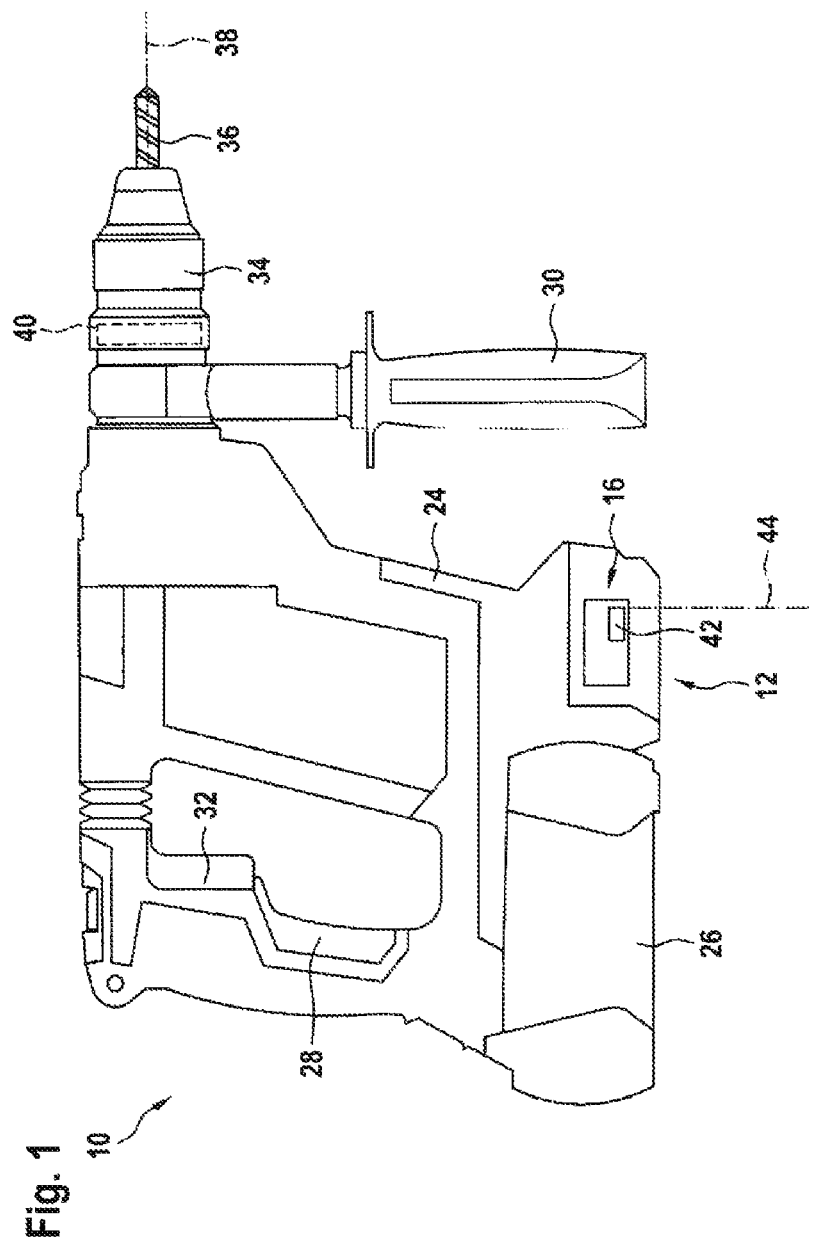
FIG. 1 shows a hand-held power tool having a sensor device, in a side view.
Figure 2:
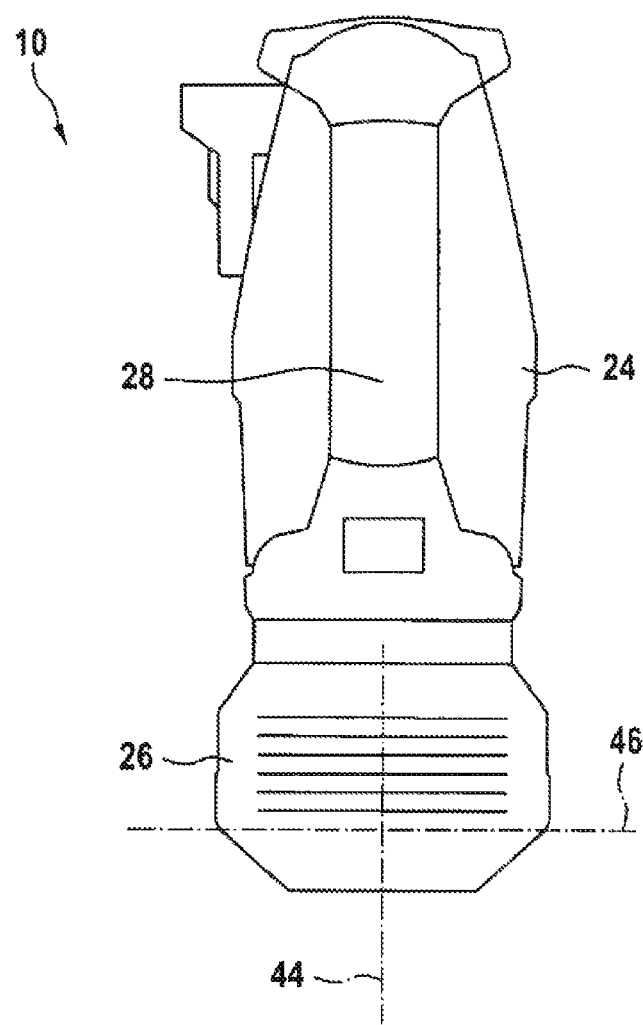
FIG. 2 shows a hand-held power tool according to FIG. 1, in a rear view.

FIGS. 1 and 2 show a hand-held power tool 10 having a sensor device. The hand-held power tool 10 is realized as a portable hand-held power tool. Moreover, the hand-held power tool 10 is realized as a hammer drill. The hand-held power tool 10 in this case has a hand-held power-tool housing 24. The hand-held power tool 10 additionally has a battery 26, two handles 28, 30 and an operating element 32. The hand-held power tool 10 additionally comprises an electric motor, not shown in greater detail, a transmission unit, not shown in greater detail, a percussion mechanism, not shown in greater detail, and a drill chuck 34. The drill chuck 34 is provided to receive an insert tool 36. In at least one operating state, the electric motor is coupled to the drill chuck 34 in a rotationally fixed manner via the transmission unit. The operating element 32 is provided for manually controlling the electric motor.

The sensor device is realized as a hand-held power-tool sensor device. The sensor device is provided to identify an uncontrolled occurrence of jamming of the hand-held power tool 10. The uncontrolled occurrence of jamming may occur, for example, if the insert tool 36 becomes jammed in a workpiece, not represented in greater detail, on which work is to be performed. A reaction torque acting on the hand-held power-tool housing 24 may in this case overcome a holding force of the operator. As a result, the hand-held power-tool housing 24 rotates in an uncontrolled manner about a rotation axis 38 of the insert tool 36. There is then an increased risk of injury to the operator. The hand-held power tool 10 comprises a mechanical detent coupling 40, which is triggered from a defined reaction torque onward. If the hand-held power tool 10 is not properly held, the hand-held power-tool housing 24 rotates about the rotation axis 38 in an uncontrolled manner.

The sensor device has a sensor unit 12. The sensor unit 12 is provided for sensing at least one motion characteristic value 14 of the hand-held power tool 10. For this purpose, the sensor unit 12 has an acceleration sensor unit 42. The acceleration sensor unit 42 is offset radially from the rotation axis 38. In the exemplary embodiment shown, the acceleration sensor unit 42 is disposed in the region of the battery 26. The acceleration sensor unit 42 is disposed on a power electronics circuit board, not represented in greater detail.

For the purpose of sensing an acceleration, the acceleration sensor unit 42 has a first sensitivity axis 44 and a second sensitivity axis 46. The sensitivity axes 44, 46 are perpendicular to each other. The first sensitivity axis 44 in this case is parallel to a radial direction of the rotation axis 38. More precisely, the first sensitivity axis 44 lies on a radial direction of the rotation axis 38. The second sensitivity axis 46 is parallel to a tangential direction about the rotation axis 38. More precisely, the second sensitivity axis 46 is perpendicular to the first sensitivity axis 44. Furthermore, the second sensitivity axis 46 is perpendicular to a parallel of the rotation axis 38.

Figure 3:
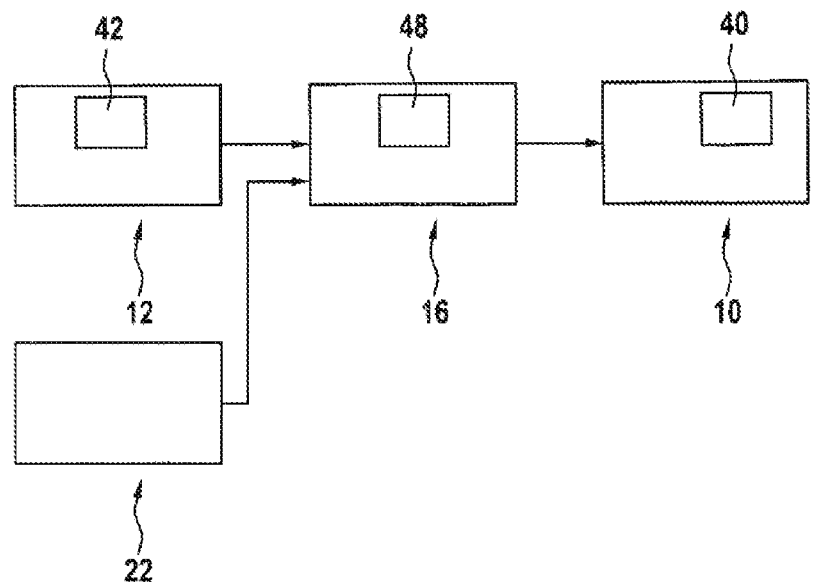
FIG. 3 shows the sensor device, in a schematic representation.

A schematic structure of the sensor device is shown in FIG. 3. The sensor device has a protective unit 16. The protective unit 16 comprises an open-loop and/or closed-loop control unit 48. The protective unit 16 is provided to evaluate an acceleration in the direction of the second sensitivity axis 46. In this case, for the purpose of determining a rotational speed of the hand-held power tool 10 about the rotation axis 38, the protective unit 16 performs an integration of the acceleration in the second sensitivity axis 46 over time. In addition, the protective unit 16 is provided to evaluate an acceleration in the direction of the first sensitivity axis 44. This acceleration is generated by a centripetal force during a rotation of the hand-held power tool housing 24 about the rotation axis 38. The protective unit 16 is provided to determine a motion characteristic value 14 from the values of the sensor unit 12. The motion characteristic value 14 is calculated by a computing unit of the open-loop and/or closed-loop control unit 48.

Figure 4:
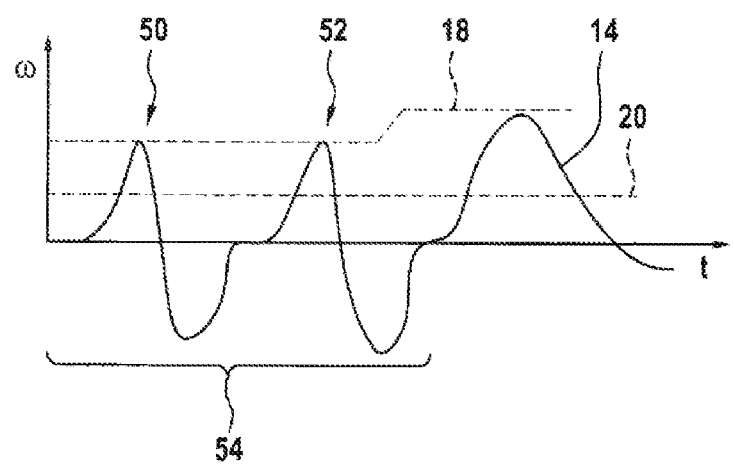
FIG. 4 shows a time diagram with triggering events of a protective unit of the sensor device.

If the motion characteristic value 14 attains or exceeds a triggering threshold value 18, a triggering case 50, 52 occurs (FIG. 4). In other words, the protective unit 16 is provided to control the hand-held power tool 10 as soon as the motion characteristic value 14 attains and/or exceeds the triggering threshold value 18. In the triggering case 50, 52, the protective unit 16 controls the hand-held power tool 10. The protective unit 16 is thus provided to control the hand-held power tool 10 in dependence on the triggering threshold value 18 and the motion characteristic value 14. More precisely, the protective unit 16 is provided to interrupt an electric power supply to the hand-held power tool 10 in the triggering case 50, 52. Furthermore, the protective unit 16 is provided to short-circuit the electric motor of the hand-held power tool 10 in the triggering case 50, 52. Likewise, the protective unit 16 is provided to activate a mechanical brake of the hand-held power tool 10, not represented, in the triggering case 50, 52. Further, the protective unit 16 is provided to open the mechanical detent coupling 40 in the triggering case 50, 52. Alternatively, it is in principle also conceivable for the protective unit 16 to be provided to set a motor rotational speed to a lesser value and/or to set a motor torque to a lesser value.

The protective unit 16 is provided to set the triggering threshold value 18 in a variable manner. More precisely, the protective unit 16 is provided to set the triggering threshold value 18 in a variable manner fully automatically during operation of the hand-held power tool 10.

The protective unit 16 is provided to set the triggering threshold value 18 in dependence on a triggering frequency. For example, the protective unit 16 is provided to raise the triggering threshold value 18 as soon as two triggering cases 50, 52 have been sensed within a certain time interval 54, for example within one minute. In FIG. 4, the time t is plotted on the x-axis, while the motion characteristic value 14, having a rotational speed ω, is represented on the y-axis. Occasionally, during operation, a material that is difficult to work causes the hand-held power tool 10 to rotate about the rotation axis 38. If the motion characteristic value 14 exceeds the triggering threshold value 18, a first triggering case 50 is triggered and the hand-held power tool 10 is switched off.

Within a monitored time interval 54, the motion characteristic value 14 again exceeds the triggering threshold value 18, and a second triggering case 52 is triggered, and the hand-held power tool 10 is switched off. Since it is assumed from this that the triggering cases 50, 52 are caused by a workpiece that is difficult to work, the protective unit 16 raises the triggering threshold value 18. During subsequent operation the motion characteristic value 14 no longer attains the triggering threshold value 18, and the operator can continue to work. The triggering threshold value 18 is then close to the motion characteristic value 14 generated by the working. An uncontrolled occurrence of jamming is thus sensed very rapidly. The protective unit 16 is additionally provided to reduce the triggering threshold value 18 back to an original value again after a relatively long period without triggering cases 52. Likewise, the protective unit 16 is provided to reset the triggering threshold value 18 following an operation of the hand-held power tool.

The protective unit 16 is additionally provided to set the triggering threshold value 18 in dependence on an operating mode of the hand-held power tool 10. In the exemplary embodiment shown, the operating mode is described by a transmission characteristic value of the hand-held power tool 10 and by a rotational-speed characteristic value of the hand-held power tool 10. The protective unit 16 is provided to set the triggering threshold value 18 in dependence on the transmission characteristic value of the hand-held power tool 10. In a first gear step, having a greater transmission ratio, the protective unit 16 sets the triggering threshold value 18 higher than in a second gear step. This allows higher torques in the first gear step, without triggering a triggering case.

For convenient sensing of the transmission characteristic value, the sensor device has an operating-mode sensor unit 22. The operating-mode sensor unit 22 is provided to sense an operating mode of the hand-held power tool 10. The protective unit 16 is provided to set the triggering threshold value 18 in dependence on the operating mode sensed by the operating-mode sensor unit 22 while operation of the hand-held power tool 10 is ongoing. In this case, the operating-mode sensor unit 22 is provided to sense the transmission characteristic value automatically. In connection with this, it is also conceivable for the transmission characteristic value to be manually settable, for example by means of an operating element such as, in particular, a switch or a pushbutton.

In addition, the protective unit 16 is provided to set the triggering threshold value 18 in dependence on a machine rotational speed of the hand-held power tool 10. More precisely, the protective unit 16 is provided to raise the triggering threshold value 18 in the case of an increasing machine rotational speed. The protective unit 16 is additionally provided to lower the triggering threshold value 18 in the case of a decreasing machine rotational speed. The operating-mode sensor unit 22 is additionally provided to sense operation of the hand-held power tool 10 and to sense vibrations.

The protective unit 16 is additionally provided to define a further triggering threshold value 20. More precisely, the protective unit 16 is provided to define the further triggering threshold value 20 during operation of the hand-held power tool 10. The protective unit 16 in this case is provided to define the further triggering threshold value 20 fully automatically. In this connection, it is conceivable for the protective unit 16 to be provided to set the further triggering threshold value 20 in a variable manner, in particular in dependence on the operating mode. In addition, the protective unit 16 is provided to control the hand-held power tool 10 differentially in dependence on the triggering threshold value 18 and the motion characteristic value 14, and in dependence on the further triggering threshold value 20 and the motion characteristic value 14. For example, the further triggering threshold value 20 is below the triggering threshold value 18. If the motion characteristic value 14 exceeds the further triggering threshold value 20, the protective unit 16 outputs a signal for switching off the electric motor of the hand-held power tool 10. After the value has subsequently fallen below the further triggering threshold value 20, the protective unit 16 automatically switches the hand-held power tool 10 on again. If the motion characteristic value 14 exceeds the triggering threshold value 18, the protective unit 16 outputs a signal for activating the mechanical detent coupling 40. In principle, other controls of the protective unit 16, considered appropriate by persons skilled in the art, are conceivable. The protective unit 16 is provided to switch off permanently before the hand-held power tool 10 is switched back on, for example by awaiting a machine stoppage.

What is claimed is:

1. A sensor device of a hand-held power-tool for identifying an uncontrolled occurrence of jamming of the hand-held power tool, the sensor device comprising:
   a sensor unit configured to sense a motion characteristic value of the hand-held power tool, the motion characteristic value based on a motion of the hand-held power-tool; and
   a protective unit operably connected to the sensor unit and configured to control the hand-held power tool based on a first triggering threshold value, a second triggering threshold value that is greater than the first triggering threshold value, and the sensed motion characteristic value, the protective unit configured to (i) sense that the motion characteristic value has exceeded the first triggering threshold value as a first triggering case, (ii) switch off the power-tool in response to the first triggering case, (iii) to sense that the motion characteristic value has exceeded the first triggering threshold value as a second triggering case subsequent to the first triggering case, (iv) switch off the power-tool in response to the second triggering case, and (v) raise the first triggering threshold value to the second triggering threshold value when the first triggering case and the second triggering case occur within a predetermined time period, such that the protective unit prevents further switching off of the power-tool in response to sensing that the motion characteristic value has exceeded the first triggering threshold value.

2. The sensor device according to claim 1, wherein the protective unit is configured to set the first triggering threshold value based on a triggering frequency.

3. The sensor device according to claim 1, wherein the protective unit is configured to reset the first triggering threshold value after operation of the hand-held power tool.

4. The sensor device according to claim 1, wherein the protective unit is configured to set the first triggering threshold value based on at least one operating mode of the hand-held power tool.

5. The sensor device according to claim 1, wherein:
   the protective unit is configured to set the first triggering threshold value based on at least one transmission characteristic value of the hand-held power tool, and
   the transmission characteristic value includes at least one of gear stage data and transmission ratio data.

6. The sensor device according to claim 1, wherein:
   the protective unit is configured to set the first triggering threshold value based on at least one rotational-speed characteristic value of the hand-held power tool, and
   the at least one rotational-speed characteristic value includes at least one of (i) an output rotational speed of the hand-held power tool, (ii) a motor rotational speed of the hand-held power tool, and (iii) a transmission rotational speed of the hand-held power tool.

7. The sensor device according to claim 1, further comprising:
   at least one operating-mode sensor unit configured to sense the operating mode of the hand-held power tool.

8. The sensor device according to claim 1, wherein the protective unit is configured to control the hand-held power tool such that the hand-held power tool executes differing operations based on the first triggering threshold value and the at least one motion characteristic value, and based on the second triggering threshold value and the at least one motion characteristic value.

9. The sensor device according to claim 1, wherein the protective unit is configured to switch off the hand-held power tool for a first pre-determined time and switch the hand-held power tool back on automatically after the first pre-determined time when the at least one motion characteristic value is equal to or above the first triggering threshold value.

10. The sensor device according to claim 1, wherein the protective unit is configured to switch off the hand-held power tool permanently when the at least one motion characteristic value is equal to or above the second triggering threshold value.

11. The sensor device according to claim 1, wherein the predetermined time period is one minute.

12. The sensor device according to claim 1, wherein the protective unit is further configured to (i) to sense that the motion characteristic value has exceeded the second triggering threshold value as a third triggering case, and (ii) switch off the power-tool in response to the third triggering case.

13. The sensor device according to claim 1, wherein the protective unit is further configured to (i) sense that the motion characteristic value has exceeded the first triggering threshold value as a first triggering case, (ii) at least one of (a) switch off the power-tool in response to the first triggering case temporarily and switch on the power-tool automatically and (b) switch off the power-tool in response to the first triggering case permanently, (iii) to sense that the motion characteristic value has exceeded the first triggering threshold value as a second triggering case subsequent to the first triggering case, (iv) at least one of (a) switch off the power-tool in response to the second triggering case temporarily and switch on the power-tool automatically and (b) switch off the power-tool in response to the second triggering case permanently, (v) raise the first triggering threshold value to the second triggering threshold value when the first triggering case and the second triggering case occur within a predetermined time period, such that the protective unit prevents further switching off of the power-tool in response to sensing that the motion characteristic value has exceeded the first triggering threshold value, and (vi) switch on the hand-held power tool automatically when the at least one triggering threshold value.

14. A hand-held power tool comprising:
a sensor device for identifying an uncontrolled occurrence of jamming of the hand-held power tool, the sensor device comprising:
a sensor unit configured to sense a motion characteristic value of the hand-held power tool, the motion characteristic value based on a motion of the hand-held power-tool; and
a protective unit operably connected to the sensor unit and configured to control the hand-held power tool based on a first triggering threshold value, a second triggering threshold value that is greater than the first triggering threshold value, and the motion characteristic value, the protective unit configured to (i) sense that the motion characteristic value has exceeded the first triggering threshold value as a first triggering case during a first operation, (ii) switch off the power-tool in response to the first triggering case, (iii) to sense that the motion characteristic value has exceeded the first triggering threshold value as a second triggering case subsequent to the first triggering case, (iv) switch off the power-tool in response to the second triggering case, and (v) raise the first triggering threshold value to the second triggering threshold value if the first triggering case and the second triggering case occur within a predetermined time period, such that the protective unit prevents further switching off of the power-tool in response to sensing that the motion characteristic value has exceeded the first triggering threshold value.

15. The hand-held power tool of claim 14, wherein the hand-held power tool is a hammer drill.

16. A method for identifying an uncontrolled occurrence of jamming of a hand-held power tool, the method comprising:
sensing a motion characteristic value of the hand-held power tool with a sensor unit of the power tool, the motion characteristic value based on a motion of the hand-held power-tool;
sensing that the motion characteristic value has exceeded a first triggering threshold value as a first triggering case with a protective unit of the power tool that is operatively connected to the sensor unit;
switching off the power tool in response to the first triggering case;
switching on the power tool following the switching off in response to the first triggering case;
sensing that the motion characteristic value has again exceeded the first triggering threshold value as a second triggering case;
switching off the power tool in response to the second triggering case; and
changing the first triggering threshold value to a second triggering threshold value that is greater than the first triggering threshold value when the first triggering case and the second triggering case occur within a predetermined time period, such that the protective unit prevents further switching off of the power-tool in response to sensing that the motion characteristic value has exceeded the first triggering threshold value.

* * * * *